United States Patent [19]

Han et al.

[11] Patent Number: 5,227,678
[45] Date of Patent: Jul. 13, 1993

[54] FAST DIGITAL COMPARISON CIRCUIT FOR FUZZY LOGIC OPERATIONS

[75] Inventors: Jia-Yuan Han, Naperville; Supreet Singh, Chicago, both of Ill.

[73] Assignee: Illinois Institute of Technology, Ill.

[21] Appl. No.: 703,632

[22] Filed: May 22, 1991

[51] Int. Cl.[5] .................................... H03K 19/017
[52] U.S. Cl. .................................. 307/443; 307/440; 307/494; 307/243; 364/269
[58] Field of Search ............... 307/440, 443, 464, 450, 307/448, 451, 243, 494; 364/769

[56] References Cited

U.S. PATENT DOCUMENTS

| | | | |
|---|---|---|---|
| 3,938,087 | 2/1976 | Louie | 340/146.2 |
| 4,337,525 | 6/1982 | Akatsuka | 307/464 |
| 4,755,696 | 7/1988 | Pickett | 307/464 X |
| 4,760,896 | 8/1988 | Yamaguchi | 187/124 |
| 4,809,175 | 2/1989 | Hosaka et al. | 364/424 |
| 4,841,815 | 6/1989 | Takahashi | 74/866 |
| 4,842,342 | 6/1989 | Takahashi et al. | 303/102 |
| 4,860,213 | 8/1989 | Bonissone | 364/513 |
| 4,864,490 | 9/1989 | Nomoto et al. | 354/157 |
| 4,918,620 | 4/1990 | Ulug | 364/513 |
| 4,922,428 | 5/1990 | Takahashi | 364/426.04 |
| 4,930,084 | 5/1990 | Hosaka et al. | 364/426.04 |
| 4,958,288 | 9/1990 | Takahashi | 364/426.04 |
| 4,966,118 | 10/1990 | Itakura et al. | 123/492 |
| 5,015,883 | 5/1991 | Waller | 307/243 X |
| 5,045,714 | 9/1991 | Park et al. | 307/243 |
| 5,053,645 | 10/1991 | Harada | 307/464 |

OTHER PUBLICATIONS

Marinos, "Fuzzy Logic and Its Application to Switching Systems", IEEE Transactions on Computers, vol. C-18, No. 4, pp. 343-348, Apr. 1969.

Sasaki, et al. "Fuzzy Multiple-Input Maximum and Minimum Circuits in Current Mode and Their Analyses Using Bounded-Difference Equations." *IEEE Transactions on Computers.* vol. 39, No. 6, Jun. 1990.

Self, Kevin. "Designing with Fuzzy Logic." *IEEE Spectrum.* Nov. 1990. pp. 42-44 and 105.

Johnson, J. T. "Fuzzy Logic." *Popular Science.* Jul. 1990. pp. 87-89.

Armstrong, et al. "Why 'Fuzzy Logic' Beats Black-Or-White Thinking." *Business Week.* May 21, 1991, pp. 92-93.

*Primary Examiner*—David Hudspeth
*Attorney, Agent, or Firm*—Speckman & Pauley

[57] ABSTRACT

A fast digital logic circuit for comparing two binary numbers and outputting the greater of the two is disclosed.

12 Claims, 6 Drawing Sheets

FAST DIGITAL COMPARISON CIRCUIT FOR FUZZY LOGIC OPERATIONS

TECHNICAL FIELD

The present invention relates to a device for implementing fast digital comparisons for fuzzy logic operations and/or other operations, and more particularly to a fast digital logic circuit for comparing two binary numbers and outputting the greater or lesser of the two.

BACKGROUND PRIOR ART

Fuzzy set theory was developed in the 1960's to provide a means to bridge the man-machine gap. Fuzzy logic is the application of fuzzy set theory to boolean algebra. It lays the mathematical framework for the development of tools to describe human thoughts and reasoning to the machine. Fuzzy logic lets computers assign numerical values that fall between zero and one. Instead of statements being only true or false, fuzzy theory sets up conditions such as slow, medium and fast, and makes a variety of computer-controlled machines run more smoothly and efficiently. Fuzzy logic has been applied to many computationally complex problems in decision making and industrial control. Applications include prosthetic device control, elevator control, washing machines, televisions, and braking controls for trains.

The basic fuzzy logic operations are: MAX, for finding the maximum of two numbers; MIN, for finding the minimum of two numbers; and INVERSE. Fuzzy operations also include ordinary numerical operations such as addition, multiplication and division. Traditionally, the MAX and MIN operations have been carried out in software in digital computers. However, computational speeds achievable with these methods are often not satisfactory for real time systems. Many of the applications for fuzzy operations are time-intensive as well as time-critical, thus the speed of fuzzy operations is extremely important. As a result, there has been an increasing effort to develop systems which have increased speed in calculating fuzzy operations.

The efforts to increase the speed of fuzzy operations have focused on developing computers that carry out these operations in hardware. To date, most research has focused on the design of special purpose analog systems. See for example, *Fuzzy Multiple-Input Maximum and Minimum Circuits in Current Mode and Their Analyses Using Bonded-Difference Equations*, Sasaki, Inoue, Shirai and Yeno, 39 IEEE Transactions on Computers 768 (June, 1990). Although, such analog systems are relatively quick, analog systems have a relatively a high degree of error and are not programmable. Also, analog systems cannot perform both basic fuzzy operations and ordinary numerical operations.

Another hardware solution for implementing fuzzy operations is to use digital circuitry. Such circuitry has the advantage of being easily incorporated into existing conventional digital computers and thus provides the facility of user-programmability. Further, digital circuitry will yield more accurate results as compared to analog circuitry.

One approach for using digital circuitry for performing fuzzy operations, such as circuitry for comparing two binary numbers, is implemented by comparing each corresponding bit of the two binary numbers, starting from the most significant bit (MSB) down to the least significant bit (LSB), while keeping track of information at each step, of the previous comparison. Thus, the numbers are compared one bit at a time with the comparison information "cascading" down from one bit to the next, lesser significant, bit. This cascading implementation is relatively slow and is therefore ineffective for use in many applications. Thus, a need exists for fast digital circuitry for comparing binary numbers.

Prior digital adding circuits have utilized "carry look-ahead circuitry" to avoid time delay resulting from cascading information, concerning whether to carry or not, from one bit to the next. Comparison circuits, as opposed to adder circuits, must be concerned with three times the information as that of an adding circuit. Comparison information is concerned with whether the numbers are equal, the first number is greater than the second, or the second number is greater than the first. All three states must be taken into consideration when designing comparison-look-ahead circuitry.

SUMMARY OF THE INVENTION

The present invention is directed to fast digital circuitry, which can be used for implementing fuzzy logic operations. Such circuits can be designed as bit-sliced or block-slice comparison circuits. Comparison circuits, which compare and then output the larger (or smaller) of two inputted numbers, form the primary components in implementing fuzzy operations.

The invention reduces the time delay resulting from propagation of comparison results in a bit cascade structure, by utilizing comparison-look-ahead circuitry. The resulting digital comparison circuits are aptly described as fast digital MAX logic circuits (for finding the larger of two numbers) or fast digital MIN logic circuits (for finding the smaller of two numbers).

In cascading comparison circuitry, variables having information of the comparison of corresponding bits from two numbers are generated one at a time and are passed sequentially from the MSB down to the LSB, and thus the output is generated one bit at a time. The circuitry of the present invention generates all comparison information simultaneously and then generates all bits of an outputted number simultaneously. This results in a large increase in the speed of the circuit.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to embodiments illustrated.

To understand the digital logic for fast comparison circuits using, it is necessary to examine the boolean equations which represent the circuits, and how they were derived. By way of example, a fast MAX operation circuit will be described, the MIN operation is similar to the MAX operation and can be easily derived from the design of the MAX circuit.

A fast MAX operation circuit compares two inputted binary numbers and outputs the maximum of the two. This can be done using a bit-sliced circuit or a block-sliced circuit. A bit-sliced circuit utilizes intermediate numbers reflecting a bit-by-bit comparison, while a block-sliced circuit utilizes intermediate numbers reflecting a block of bits by a block-of-bits comparison. The bit-sliced circuit will be described first.

In a bit-sliced circuit, n bit binary numbers A and B, represented by $a_{a-1} a_{n-2} \ldots a_i \ldots a_1 a_0$ and $b_{n-1} b_{n-2} \ldots b_i \ldots b_1 b_0$, respectively, are inputted into n modules. The bits $a_i$, $b_i$ are inputted into the ith module (i=0,1,2 ... n−1). An output o is represented by $o_{a-1} o_{n-2} \ldots o_i \ldots o_1 o_0$.

When comparing the two binary numbers A and B, the decision of which bit ($a_i$ or $b_i$) is outputted at the ith module ($o_i$), depends on the decision at the output of the previous stage ($o_{i+1}$). In a cascading comparison circuit, variables $f_i^o$ and $c_i^o$ are used to propagate this information from one module to the next (o in the superscript denotes a bit-sliced variable).

Variable $c_i^0$ is defined so that if $c_i^o = 1$, then the bits of the numbers A and B preceding the bit i−1 are equal. Variable $f_i^o$ is defined so that if $f_i^0 = 1$, then the bits of the number A preceding the bit i−1 is greater than the corresponding bits of B. In other words, because the MSB portion of the number A is greater than the MSB portion of the number B, the entire number A is greater than the number B. If the parts of A and B preceding the i−1 bit are not equal (i.e., $c_i^o = 0$) and A is not greater than B (i.e., $f_i^0 = 0$), then the part of B preceding the i−1 bit is greater than the corresponding part of the number A, and thus, the number B is greater than the number A.

The variables $c_n^0$ and $f_n^0$ are initially given the values of $c_n^0 = 1$ and $f_n^0 = 0$. This allows for comparison of the MSB's of A and B (i.e., $a_{n-1}$ and $b_{n-1}$).

In order to develop the circuit, variables $Z_i^o$ and $Y_i^o$ are utilized. Variable $Z_i^o$ is defined so that $Z_i^o = 1$ if and only if $a_i = b_i$. $Z_i^o$ can be expressed as:

$$Z_i^o \leq a_i b_i + \overline{a_i} \overline{b_i} \qquad (1)$$

Variable $Y_i^o$ is defined so that $Y_i^o - 1$ if and only if $a_i$ is greater than $b_i$. $Y_i^o$ can be expressed as:

$$Y_i^o = a_i \overline{b_i} \qquad (2)$$

Thus, variables $Z_i^o$, $Y_i^o$ are only dependent upon the corresponding inputs $a_i$, $b_i$ at the ith module. The variables $Z_i^o$ and $Y_i^o$ are not concerned with any comparisons of other bits.

For $f_i^o$, if $c_{i+1}^o = 1$ (i.e., the parts of A and B preceding the ith bits are equal), then if $Z_i^o = 1$ (i.e., $a_i = b_i$) then $f_i^o \neq 1$ (or $f_i^o = 0$), if $Z_i^o = 0$ (i.e., $a_i \neq b_i$) then if $Y_i^o = 1$ (i.e., $a_i$ is greater than $b_i$) then $f_i^o = 1$ (A is greater than B) otherwise if $Y_i^o = 0$ (i.e., $a_i$ is not greater than $b_i$) then $f_i^o = 0$ (i.e., B is greater than A). If $d_{i+1}^o = 0$ (i.e., the parts of A and B preceding the ith bits are not equal) then $f_i^o = f_{i+1}^o$ (i.e., whichever number is greater stays that way). From this, we can express $f_i^o$ as:

$$f_i^o = f_{i+1}^o + c_{i+1}^o Y_i^o \qquad (3)$$

where $f_i^o$ is dependent on the values of $f_{i+1}^o$, $c_{i+1}^o$ from the previous module, and $Y_i^o$ from a comparison of $a_i$ and $b_i$.

For $c_i^o$, if $c_{i+1}^o = 0$ (i.e., the parts of A and B preceding their respective ith bits are not equal) then $c_i^o = 0$ (i.e., A and B are still not equal). If $c_{i+1}^o = 1$ (i.e., the parts of A and B preceding the ith bits are equal) then if $Z_i^o = 1$ (i.e., $a_i = b_i$) then $c_i^o = 1$ (i.e., A and B are still equal through the ith bits (otherwise if $Z_i^o = 0$ (i.e., $a_i$ is not equal to $b_i$), then $c_i^o - 0$ (i.e., the parts of A and B preceding the bits i−1 are not equal). From this we can express $c_i^o$ as:

$$c_i^o = c_{i+1}^o Z_i^o \qquad (4)$$

where $c_i^o$ is dependent on the values of $c_{i+1}^o$ from the previous module, and on $Z_i^o$ from a comparison of $a_i$ and $b_i$.

The output $o_i$ is equal to $a_i$ if A and B are not equal (i.e., $c_i^o = 0$) and if A is greater than B (i.e., $f_i^o = 1$). The output $o_i$ is equal to $b_i$ if A and B are not equal (i.e., $c_i^o = 0$) and if B is greater than A (i.e., $r_i^o = 0$). From this, we can express $o_i$ as:

$$o_i = a_i f_i^o + b_i \overline{f_i^o} \qquad (5)$$

where $o_i$ is only dependent on the values of $f_i^o$, $a_i$ and $b_i$. When $c_i = 1$, it does not matter whether $o_i$ is set equal to $a_i$ or $b_i$ because $a_i = b_i$.

Equations (1)–(5) can be realized using binary logic gates and can be cascaded to obtain a n-bit circuit. However, the operating speed of the cascaded structure is nessarily relatively slow.

The bit-sliced of the present invention circuit, which will speed up the MAX operation, can be derived by recursively calculating equations (3) and (4). For example, if n=4, using equation (4) we can calculate $c_i^o$ as follows:

$$c_3^o = c_4^o Z_3^o \qquad (6)$$

$$c_2^o = c_3^o Z_2^o, \text{ substituting for } c_3^o \qquad (7)$$

$$c_2^o = c_4^o Z_3^o Z_2^o \qquad (7')$$

$$c_1^o = c_2^o Z_1^o, \text{ substituting for } c_2^o \qquad (8)$$

$$c_1^o = c_4^o Z_3^o Z_2^o Z_1^o \qquad (8')$$

$$c_o^o = c_1^o Z_o^o, \text{ substituting for } c_1^o \qquad (9)$$

$$c_o^o = c_4^o Z_3^o Z_2^o Z_1^o Z_o^o \qquad (9')$$

Thus, as shown in equations (6), (7'), (8') and (9'); $c_3^o$, $c_2^o$, $c_1^0$ and $c_o^0$ can be expressed solely in terms of $c_4^0$ (i.e., $c_n^0$, which is set equal to 1) and the variable $Z_i^o$. Therefore, calculations of $c_i^o$ is no longer dependent upon $c_{i+1}^o$. Therefore, calculations of $c_i^o$ and does not have to wait for $c_{i+1}^o$ first to be computed. In general terms, for n bits, $c_i^o$ can be expressed as:

$$c_i^o = c_n^o Z_{n-1}^o Z_{n-2}^o \ldots Z_i^o \qquad (10)$$

Similarly, one can recursively calculate equation (3) to obtain in general terms, for n bits, an expression of $f_i^o$ as:

$$f_i^o = f_n^o + c_n^o(Y_{n-1}^o + Z_{n-1}^o Y_{n-2}^o + \ldots + Z_{n-1} Z_{n-2}^o \ldots Z_{i+1}^o Y_i^o) \quad (11)$$

We can set $f_n^o = 0$ and $c_n^o = 1$. $f_i^o$ is only dependent on variables $f_n^o$, $c_n^o$, $Z_i^o$ and $Y_i^o$ and no longer needs to wait for computation of $f_{i+1}^o$ or $c_{i+1}^o$.

Figure 1:
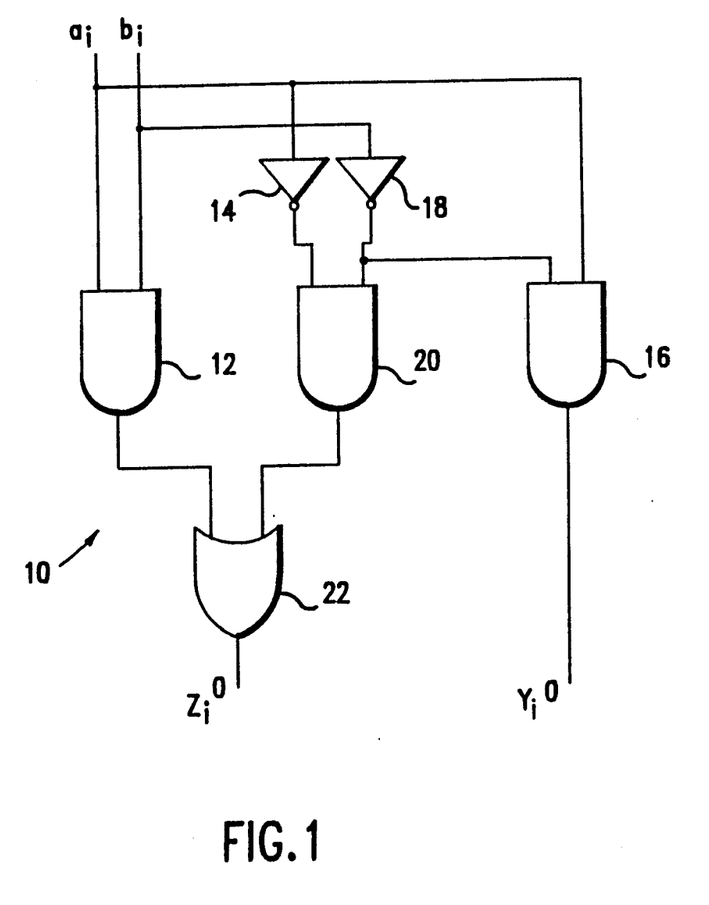
FIG. 1 discloses a schematic diagram of a digital circuit for comparing two bits.

A circuit for comparing one bit inputs $a_i$, $b_i$ and generating outputs $Z_i^o$, $Y_i^o$, is shown as the ith module 10 in FIG. 1. Inputs $a_i$, $b_i$ are electrically coupled to an AND gate 12. Bit $a_i$ is further coupled to a NOT gate 14 and to an AND gate 16. Bit $b_i$ is further coupled to a NOT gate 18. The output of NOT gate 18 is coupled to AND gates 16 and 20. The outputs of AND gates 12 and 20 are coupled to an OR gate 22. The output of OR gate 22 is $Z_i^o$, and the output of AND gate 16 is $Y_i^o$.

Figure 2:
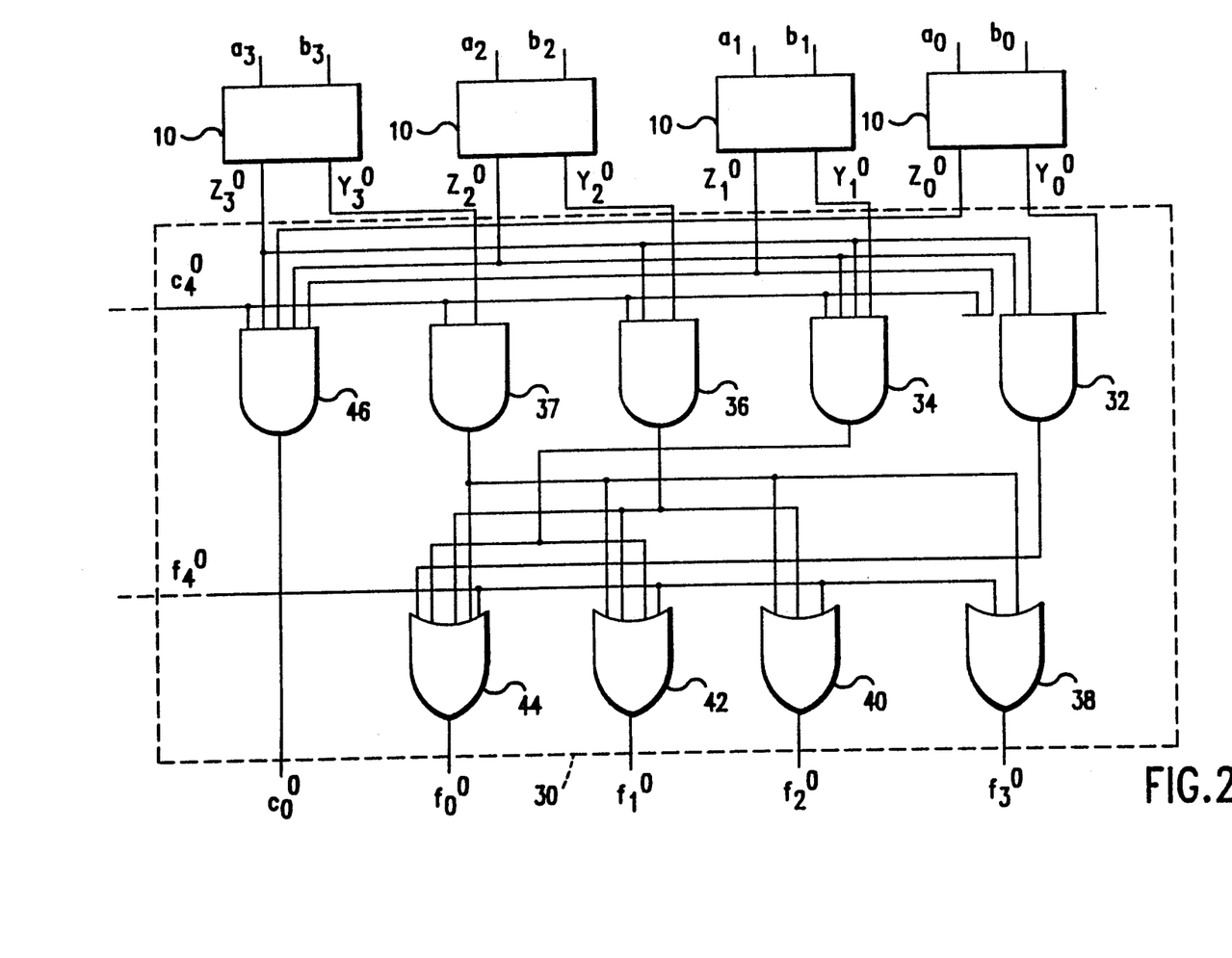
FIG. 2 discloses a schematic diagram of a four bit, bit sliced digital comparison circuit utilizing comparison-look-ahead circuitry made in accordance with the present invention.

The modules 10, represented by rectangular blocks, are utilized in a four bit, bit-sliced circuit 30 shown in FIG. 2. Bits $a_0$, $b_0$ are inputted into a first module 10 to produce $Z_o^0$, $Y_o^0$. Bits $a_2$, $b_2$ are inputted into a third module 10 to produce $Z_2^0$, $Y_2^0$. Bits $a_3$, $b_3$ are inputted into a fourth module 10 to produce $Z_3^0$, $Y_3^0$.

$c_4^o$, $Z_3^o$, $Z_2^0$, $Z_1^0$, and $Y_0^0$ are coupled to an AND gate 32. $c_4^0$, $Z_3^o$, $Z_2^0$, $Z_1^0$ and $Y_1^0$ are coupled to an AND gate 34. $c_4^0$, $Z_3^0$, $Z_2^0$ and $Y_2^0$ are coupled to an AND gate 36. $c_4^0$, $Y_3^0$ are coupled to an AND gate 36. $c_4^0$, $Y_3^0$ are coupled to an AND gate 37.

$f_4^0$ and the output of AND gate 37 are coupled to an OR gate 38. $f_4^0$ and the outputs of AND gates 36 and 37 are coupled to an OR gate 40. $f_4^0$ and the outputs of AND gates 37, 36 and 34 are coupled to an OR gate 42. $f_4^0$ and the outputs of AND gates 37, 36, 34 and 32 are coupled to an OR gate 44.

The output of OR gate 38 is $f_3^0$. The output of OR gate 40 is $f_2^0$. The output of OR gate 42 is $f_1^0$. The output of OR gate 44 is $r_0^0$.

$c_4^0$, $Z_3^0$, $Z_2^0$, $Z_1^0$, $Z_0^0$ are connected to an AND gate 46. The output of AND gate 46 is $c_0^0$.

Using these values of $f_i^0$, which have been calculated simultaneously, equation (5) can be easily implemented to achieve the final output $o_i$.

Figure 3:
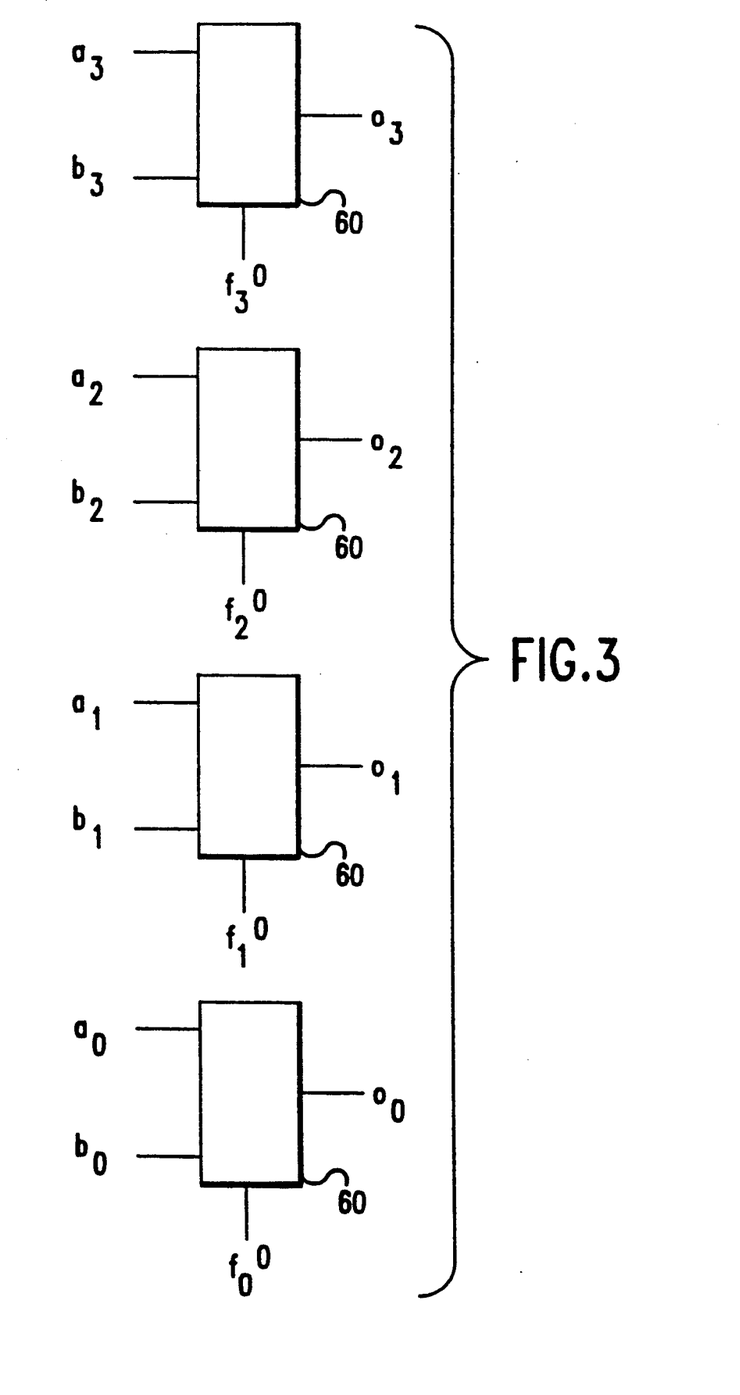
FIG. 3 discloses a schematic diagram of multiplexors for generating an output from the circuit shown in FIG. 2.

Equation (5) can be implemented as a two bit multiplexor where $O_i$ obtains the value of $a_i$ or $b_i$ depending on the state of $f_i^0$. Multiplexors 60, are shown in FIG. 3 for obtaining $o_3 o_2 o_1 o_0$.

Bit-sliced circuits can be used in combination with other bit-sliced circuits to create a hybrid bit-sliced/cascading comparison circuit. For instance, a four bit, bit-sliced circuit, such as circuit 30, can be linked to another four bit, bit-sliced circuit 30 to crate an eight bit comparison circuit. This hybrid circuit simultaneously compares the four most significant bits and then simultaneously compares the four least significant bits. Additional circuits can be similarly linked to increase the size of the hybrid circuit.

For circuit 30, $c_4^0$ and $f_4$ (i.e., $c_n^0$ and $f_n^0$, since $n=4$) are used to potentially link circuit 30 to any preceding comparison circuits. When not used in conjunction with a preceding circuit, $c_4^0$ is set equal to 1, and $f_1^0$ is set to equal 0. The circuit computes $c_0^0$ and $f_0^0$ for a similar purpose. $c_0^0$ and $f_0^0$ may be used to connect circuit 30 to a subsequent circuit (i.e., $c_0^0$ and $f_0^0$ from circuit 30 become $c_n^0$ and $f_n^0$ for the subsequent circuit). In this manner, bit-sliced circuits can be easily connected in a cascading fashion to handle comparisons of any size binary number.

The principles used to create the bit-sliced circuit can be applied to create a block-sliced structure having, in the general case, d bits per block and n blocks in a binary word. Binary numbers A and B can be expressed as groups of blocks, $A_{n-1} \ldots A_i \ldots A_0$, and $B_{n-1} \ldots B_i \ldots B_0$, respectively, with $A_i$ and $B_i$ representing the ith block.

For d=4, we can express $A_i$ (the ith block) as $a_{id+d-1} a_{id+d-2} a_{id+d-3} a_{id+d-4}$, and therefore $A_0$ (the least significant block) can be expressed as $a_3 a_2 a_1 a_0$.

Variables $f_i^I$, $c_i^I$, $Z_i^I$ and $Y_i^I$ can be used to define the block-sliced circuit (I in the superscript denotes a block-sliced variable). $Z_i^I$ is defined so that $Z_i^I = 1$ if and only if $A_i = B_i$. $Y_i^I$ is defined so that $Y_i^I = 1$ if and only if $A_i > B_i$. $c_i^I$ is defined so that if $c_i^I = 1$, then the parts of A and B preceding the block $i-1$ are equal. $f_i^I$ is defined so that if $f_i^I = 1$ then the part of A preceding the block $i-1$ is greater than the corresponding part of B, in other words, A is greater than B.

With the same reasoning which was applied to the bit-sliced circuit, we can obtain equations:

$$c_i^I = c_n^I Z_{n-1}^I Z_{n-2}^I \ldots Z_i^I \quad (12)$$

$$f_i^I = f_n^I + c_n^I(Y_{n-1}^I + Z_{n-1}^I Y_{n-2}^I + \ldots + Z_{n-1}^I Z_{n-2}^I \ldots Z_{i+1}^I Y_i^I) \quad (13)$$

In order to determine $Z_i^I$, for block i, each bit of $A_i$ must be compared with the corresponding bit of $B_i$. If all bits of $A_i$ equal the corresponding bits of $B_i$, then $Z_i^I = 1$. We can thus express $Z_i^I$, in terms of a bit by bit comparison, as:

$$Z_i^I = Z_{id+d-1}^0 Z_{id+d-2}^0 \ldots Z_{id}^0 \quad (14)$$

Similarly, $Y_i^I - 1$ when a bit from $A_i$ is greater than the corresponding bit from $B_i$ and the bits preceding these two are all the same. Thus $Y_i^I$ can be expressed as:

$$Y_i^I = Y_{id+d-1}^0 + Z_{id+d-1}^0 Y_{id+d-2}^0 \ldots + Z_{id+d-1}^0 Z_{id+d-2}^0 \ldots Z_{id+1}^0 Y_{id}^0 \quad (15)$$

Figure 4:
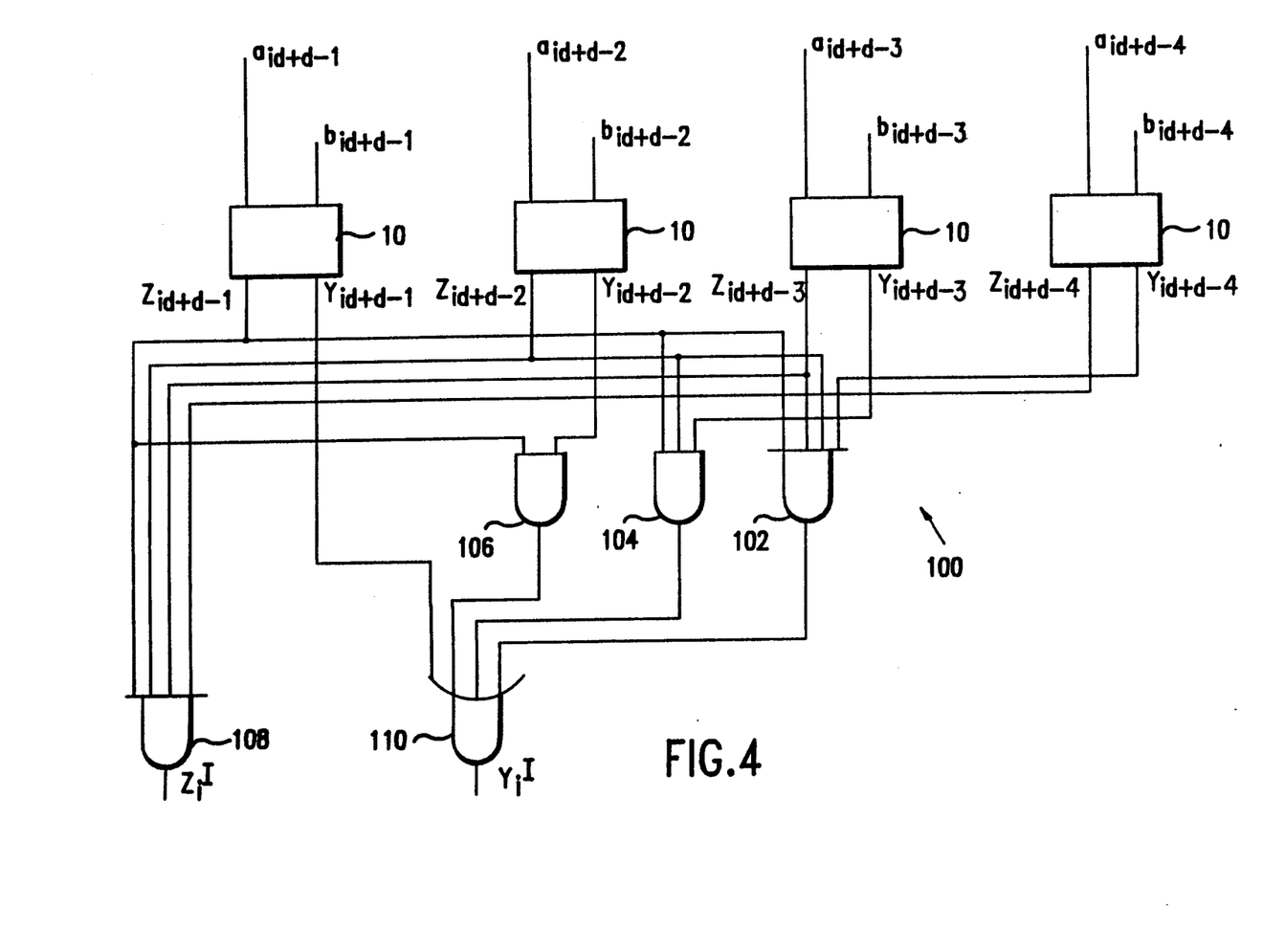
FIG. 4 discloses a schematic diagram of a digital circuit for generating values for intermediate numbers $Z_i^j$ and $Y_i^j$ for the block-sliced circuit.

A circuit module 100 for computing the values of $Z_i^I$, $Y_i^I$, where d=4 (i.e., each block has 4 bits), is shown in FIG. 4. Inputs $a_{id+d-4}$, $b_{id+d-4}$ into a first module 10 produce $Z_{id+d-4}^0$, $Y_{id+d-4}^0$. Inputs $a_{id+d-3}$, $b_{id+d-3}$ into a second module 10 produce $Z_{id+d-3}^0$, $Y_{id+d-3}^0$. Inputs $a_{id+d-2}$, $b_{id+d-2}$ into a third module 10 produce $Z_{id+d-2}^0$, $Y_{id+d-2}^0$. Finally, inputs $a_{id+d-1}$, $b_{id+d-1}$ into a fourth module 10 shown in FIG. 1 produce $Z_{id+d-1}^0$, $Y_{id+d-1}^0$.

$Z_{id+d-1}^0$, $Z_{id+d-2}^0$, $Z_{id+d-3}^0$ and $Y_{id+d-4}^0$ are coupled to an AND gate 102. $Z_{id+d-1}^0$, $Z_{id+d-2}^0$ and $Y_{id+d-3}^0$ are coupled to an AND gate 104. $Z_{id+d-1}^0$ and $Y_{id+d-2}^0$ are coupled to an AND gate 106, $Z_{id+d-1}^0$, $Z_{id+d-2}^0$, $Z_{id+d-3}^0$ and $Z_{id+d-4}^0$ are coupled to an AND gate 108. $Y_{id+d-1}^0$ and the outputs of AND gates 102, 104 and 106 are coupled to an OR gate 110.

The output of AND gate 108 is $Z_i^I$ and the output of OR gate 110 is $Y_i^I$.

The modules 100 for computing $Z_i^I$, $Y_i^I$ can be used to create a block-sliced circuit nearly identical to the bit-sliced circuit shown in FIG. 2.

Figure 5:
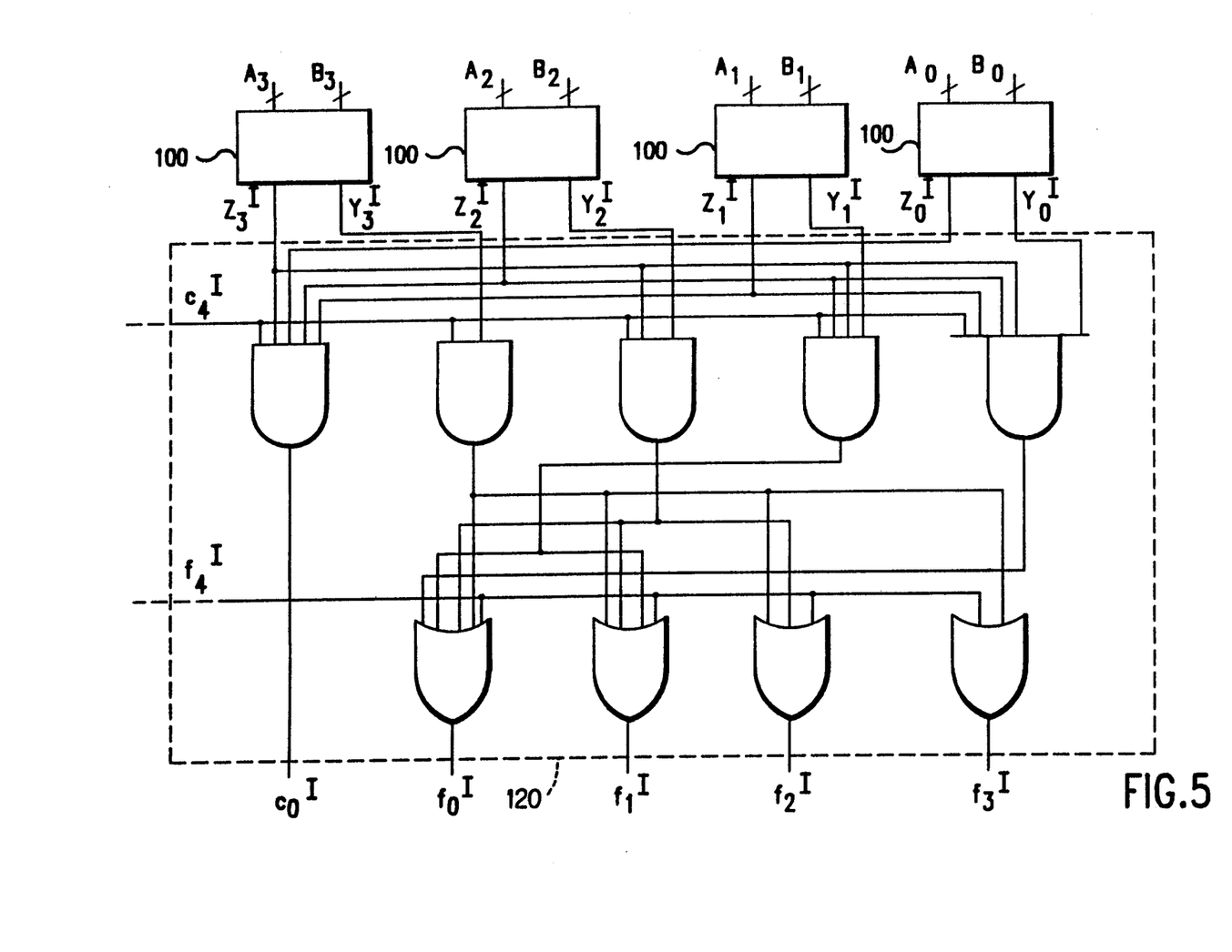
FIG. 5 discloses a schematic diagram of a four block, four bit, block-sliced digital comparison circuit made in accordance with the present invention.

A block-sliced circuit 120 is shown in FIG. 5. $A_0$, $B_0$ are inputted into a first module 100 to produce $Z_0^I$, $Y_0^i$. $A_1$, $B_1$ are inputted into a second module 100 to produce $Z_1^J$, $Y_1^J$. $A_2$, $B_2$ are inputted into a third module 100 to produce $Z_2^J$, $Y_2^j$. Finally, $A_3$, $B_3$, each having four bits, are inputted into a fourth module 100 to produce $Z_3^J$, $Y_3^J$.

The portion of the block-sliced circuit following the generation of $Z_i^J$, $Y_i^J$, shown enclosed in dashed lines for generating $c_0^J$, $f_3^J$, $f_2^J$, $f_1^J$, $f_0^j$, is identical to the portion of the bit-sliced circuit, shown in FIG. 2, also enclosed in dashed lines, for generating $c_0^0$, $f_3^0$, $f_2^0$, $f_1^0$, $f_0^0$.

The output O for the block-sliced circuit, represented by $O_{n-1} \ldots O_1 \ldots O_0$, can be generated using the values of $f_i^J$. For the ith block, $O_i$ can be expressed as:

$$O_i = A_i f_i^J + B_i \bar{f}_i \qquad (16)$$

where each $O_i$ has d bits. As in the case of the bit-sliced circuit, $O_i$ can be generated using a multiplexor.

Figure 6:
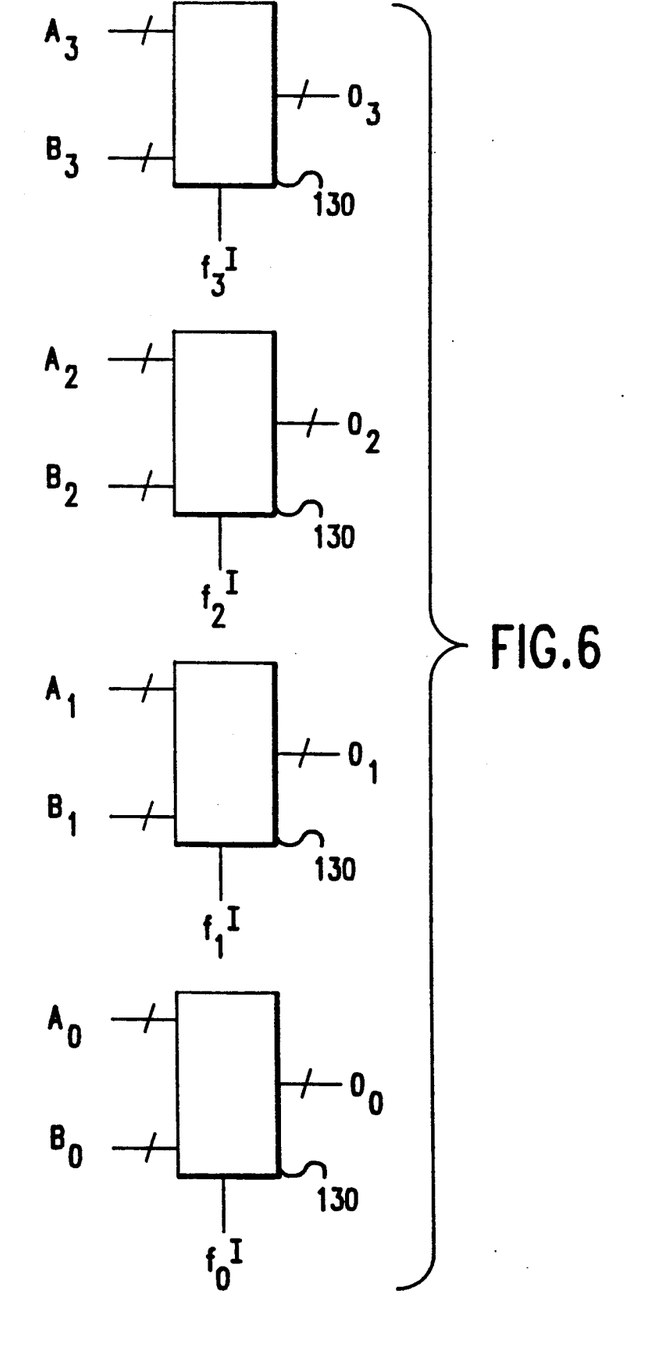
FIG. 6 discloses a schematic diagram of multiplexors for generating the output of the circuit shown in FIG. 5.

Multiplexors 130 are shown in FIG. 6 for obtaining $O_3$ $O_2$ $O_1$ $O_0$.

$c_4^J$, $f_4^J$, and $c_0^J$ function in the same manner as $c_4^0$, $f_4^0$ and $c_4^0$. Thus, block-sliced circuits can be connected to handle comparisons of any size binary number.

By examining the definition of the block-sliced circuit, it can be appreciated that the bit-sliced circuit is just a special case of the block sliced circuit where $d=1$.

A circuit for implementing the MIN operation can be easily obtained by inputting all values of $f_i^0$ or $f_i^J$ (using NOT gates) before they are inputted into the multiplexors.

While the specific embodiments have been illustrated and described, numerous modifications come to mind without significantly departing from the spirit of the invention and the scope of protection is only limited by the scope of the accompanying claims.

The performance of the bit-sliced and block-sliced circuits can be compared with a purely cascading structure in terms of the total time (i.e., number of gate delays) necessary to obtain the desired output and the number of gates required to implement each type of circuit.

For circuits which can compare sixteen bit binary numbers (in terms of a single gate delay $\tau$) the total bit-sliced circuit has a total time delay of $5\tau$, the block-sliced circuit (having four bits per block) has a total time delay of $7\tau$ and the bit cascaded circuit has a total time delay of $32\tau$. While the bit-sliced circuit is fastest, over 2 million gates are required to implement the sixteen bit circuit. The block-sliced circuit requires approximately 900 gates and the bit cascaded circuit requires approximately 500 gates. Thus, while the block-sliced circuit is slightly slower than the bit-sliced circuit, it is cost-effect in terms of the number of gates required to implement it.

We claim:

1. A circuit for comparing a first binary number to a second binary number, said first and second binary numbers having corresponding least significant bits, each of said first and second binary numbers comprising an equal plurality of blocks of bits, and generating an output binary number equal to either the greater or the lesser of said first binary number and said second binary number, said circuit comprising:

means for generating in parallel an intermediate plurality of bits, each of said plurality of bits corresponding to a respective pair of said blocks, each of said bits indicating which one of said pair of blocks is to be outputted; and means responsive to said intermediate plurality of bits for generating an output number composed of said outputted blocks.

2. The circuit of claim 1 wherein each of said blocks are of equal size.

3. The circuit of claim 2 wherein each of said blocks consist of 1 bit.

4. The circuit of claim 2 wherein said outputted number is the greater of said first binary number and said second binary number.

5. The circuit of claim 2 wherein said outputted number is the lesser of said first binary number and said second binary number.

6. A circuit for comparing a first binary number to a second binary number, said first and second binary numbers having corresponding most significant bits consecutively followed to corresponding least significant bits, and generating an output binary number equal to the larger of said first binary number and said second binary number, comprising:

means for receiving said first binary numbers and said second binary number;

means for generating in parallel an intermediate plurality of bits corresponding to said bits of said first and second binary numbers, said intermediate plurality of bits indicating the highest significant bit of said first binary number that is greater than said corresponding bit of said second binary number; and means responsive to said intermediate plurality of bits for generating in parallel an output binary number corresponding to said first and second binary numbers, said output binary number having bits progressing from said most significant bit equal to said corresponding bits of said second binary number until the bit at which said highest significant bit of said first binary number is greater than said corresponding bit of said second binary number, said remaining, lesser significant bits of said output binary number equal to said corresponding bits of said first binary number.

7. A digital circuit for comparing a first binary number to a second binary number and generating an output binary number equal to the greater of said first binary number and said second binary number, said first and second and output binary numbers having corresponding most significant bits consecutively followed to corresponding least significant bits, said circuit comprising:

a plurality of first digital implementations, each of said first digital implementations corresponding to a respective pair of said bits of said first binary number and said second binary number, each first digital implementation being set to a binary value of 1 if and only if the corresponding bits of said first binary number and said second binary number are equal;

a plurality of second digital implementations, each of said second digital implementations corresponding to a respective pair of bits of said first binary number and said second binary number, each said second digital implementation being set to a binary value of 1 if and only if said bit of said first binary number is greater than the corresponding bit of said second binary number;

a plurality of third digital implementations responsive to said first and second digital implementations, each third digital implementation corresponding to a bit of said output binary number, each of said third digital implementations indicating which of said bits of said first binary number and said second binary number are outputted, each of said third digital implementations being independent of the remaining third digital implementations; and a plurality of fourth digital implementations responsive to said third digital implementation and said bits of said first binary number and said second binary number for producing said output binary number.

8. The circuit of claim 7 wherein said first binary number, said second binary number and said output binary number each comprise 16 bits.

9. The circuit of claim 7 wherein said fourth digital implementations comprise a plurality of multiplexors, each of said multiplexors corresponding to a respective pair of said bits of said first binary number and said second binary number, each pair of bits of said first binary number and said second binary number being inputs to the respective multiplexor, each of said multiplexors outputting a respective bit of said output binary number.

10. A digital circuit for comparing a first binary number to a second binary number and generating an output binary number equal to the lesser of said first binary number and said second binary number, said first and second and output binary numbers having corresponding most significant bits consecutively followed to corresponding least significant bits, said circuit comprising:

a plurality of first digital implementations, each of said first digital implementations corresponding to a respective pair of said bits of said first binary number and said second binary number, each first digital implementation being set to a binary value of 1 if and only if the corresponding bits of said first binary number and said second binary number are equal;

a plurality of second digital implementations, each of said second digital implementations corresponding to a respective pair of bits of said first binary number and said second binary number, each said second digital implementation being set to a binary value of 1 if and only if said bit of said first binary number is greater than the corresponding bit of said second binary number;

a plurality of third digital implementations responsive to said first and second digital implementations, each third digital implementation corresponding to a bit of said output binary number, each of said third digital implementations indicating which of said bits of said first binary number and said second binary number are outputted, each of said third digital implementations being independent of the remaining third digital implementations; and a plurality of fourth digital implementations responsive to said third digital implementation and said bits of said first binary number and said second binary number for producing said output binary number.

11. The circuit of claim 10 wherein said first binary number, said second binary number and said output binary number comprise 16 bits.

12. The circuit of claim 10 wherein said fourth digital implementations comprise a plurality of multiplexors, each of said multiplexors corresponding to a respective pair of said bits of said first binary number and said second binary number, each pair of bits of said first binary number and said second binary number being inputs to the respective multiplexor, each of said multiplexors outputting a respective bit of said output binary number.

* * * * *